US008890473B2

(12) United States Patent
Muller et al.

(10) Patent No.: US 8,890,473 B2
(45) Date of Patent: Nov. 18, 2014

(54) SEQUENTIAL CHARGING OF MULTIPLE ELECTRIC VEHICLES

(75) Inventors: Michael Muller, Harper Woods, MI (US); Garret Miller, Owatonna, MN (US); Charles K. Yankitis, New Baltimore, MI (US)

(73) Assignee: Bosch Automotive Service Solutions LLC, Warren, MI (US)

( * ) Notice: Subject to any disclaimer, the term of this patent is extended or adjusted under 35 U.S.C. 154(b) by 464 days.

(21) Appl. No.: 12/974,405

(22) Filed: Dec. 21, 2010

(65) Prior Publication Data
US 2011/0144823 A1   Jun. 16, 2011

Related U.S. Application Data

(63) Continuation-in-part of application No. 12/772,519, filed on May 3, 2010, which is a continuation-in-part of application No. 12/646,276, filed on Dec. 23, 2009.

(60) Provisional application No. 61/229,104, filed on Jul. 28, 2009.

(51) Int. Cl.
| | | |
|---|---|---|
| H02J 7/00 | (2006.01) | |
| B60L 11/18 | (2006.01) | |
| H01R 24/84 | (2011.01) | |
| B60L 3/04 | (2006.01) | |
| H02J 7/02 | (2006.01) | |
| G05D 9/00 | (2006.01) | |

(52) U.S. Cl.
CPC .............. *B60L 3/04* (2013.01); *B60L 11/1818* (2013.01); *Y02T 10/7088* (2013.01); *Y04S 30/14* (2013.01); *Y02T 90/163* (2013.01); *Y02T 90/14* (2013.01); *B60L 2250/18* (2013.01); *Y02T 10/7055* (2013.01); *Y02T 10/7005* (2013.01); *B60L 11/1846* (2013.01); *Y02T 90/169* (2013.01); *H01R 24/84* (2013.01); *Y02T 90/121* (2013.01); *H02J 7/0027* (2013.01); *Y02T 10/6269* (2013.01); *Y02T 90/128* (2013.01); *H02J 7/022* (2013.01); *B60L 11/185* (2013.01); *B60L 2230/16* (2013.01); *B60L 11/184* (2013.01); *Y10S 903/903* (2013.01)
USPC ............................ 320/109; 700/297; 903/903

(58) Field of Classification Search
CPC ... Y02T 90/14; B60L 11/184; B60L 11/1846; B60L 11/185
USPC ............................ 320/109; 700/297; 903/903
See application file for complete search history.

(56) References Cited

U.S. PATENT DOCUMENTS

| | | |
|---|---|---|
| 4,820,187 A | 4/1989 | May |
| 5,462,439 A | 10/1995 | Keith |

(Continued)

FOREIGN PATENT DOCUMENTS

WO    2010055411 A1    5/2010

OTHER PUBLICATIONS

International Search Report & Written Opinion for PCT/US2012/040462, mailed Aug. 27, 2012.

(Continued)

*Primary Examiner* — Drew A Dunn
*Assistant Examiner* — Nathaniel Pelton
(74) *Attorney, Agent, or Firm* — Baker & Hostetler LLP

(57) ABSTRACT

An apparatus and method for sequentially charging multiple electric vehicles. The apparatus including an electric vehicle supply equipment (EVSE) having an electrical plug connected to a power cord. The power cord is connected to a housing containing a number of electrical components configured to control the power flow to an electric vehicles to recharge the vehicles' batteries. The power cord is divided into multiple power cords that extend from the housing and connect to standard electric vehicle connectors compatible with battery electric vehicles (BEV) and plug-in hybrid electric vehicles (PHEV). The EVSE determines, based on a number of possible criteria, which of the multiple electric vehicles to charge at a given time.

24 Claims, 6 Drawing Sheets

(56) References Cited

U.S. PATENT DOCUMENTS

| | | | |
|---|---|---|---|
| 5,548,200 A | 8/1996 | Nor et al. | |
| 5,563,491 A | 10/1996 | Tseng | |
| 5,721,481 A | 2/1998 | Narita et al. | |
| 5,803,215 A * | 9/1998 | Henze et al. | 191/2 |
| 6,198,251 B1 * | 3/2001 | Landon | 320/124 |
| 6,316,908 B2 | 11/2001 | Kajiura | |
| 6,483,272 B1 | 11/2002 | Terada et al. | |
| 6,833,683 B2 | 12/2004 | Winkler | |
| 6,905,362 B2 | 6/2005 | Williams | |
| 6,951,206 B2 | 10/2005 | Kishimoto | |
| 7,253,584 B2 | 8/2007 | Souther et al. | |
| 7,254,468 B2 | 8/2007 | Pillar et al. | |
| 7,256,516 B2 * | 8/2007 | Buchanan et al. | 307/62 |
| 7,278,878 B2 | 10/2007 | Draggie et al. | |
| 7,579,807 B2 | 8/2009 | Funabashi et al. | |
| 7,690,453 B2 | 4/2010 | Kinoshita et al. | |
| 8,085,034 B2 | 12/2011 | Sirton | |
| 8,111,043 B2 | 2/2012 | Redmann | |
| 8,143,842 B2 | 3/2012 | Tyler et al. | |
| 8,151,916 B2 | 4/2012 | Gearhart | |
| 8,299,754 B2 | 10/2012 | Hayashigawa et al. | |
| 2009/0313098 A1 * | 12/2009 | Hafner et al. | 705/14.1 |
| 2010/0017249 A1 * | 1/2010 | Fincham et al. | 705/8 |
| 2010/0174667 A1 | 7/2010 | Vitale et al. | |
| 2010/0241560 A1 * | 9/2010 | Landau-Holdsworth et al. | 705/39 |
| 2010/0268406 A1 | 10/2010 | Ito et al. | |
| 2011/0029146 A1 | 2/2011 | Muller et al. | |
| 2011/0074351 A1 | 3/2011 | Bianco et al. | |
| 2011/0169447 A1 * | 7/2011 | Brown et al. | 320/109 |

OTHER PUBLICATIONS

International Search Report & Written Opinion for PCT/US2011/066380, prepared Jun. 13, 2012.

Robert Krause, et al., "Solid-State Relays Simplify Monitoring Electric-Car Battery Voltage," EDN, Feb. 19, 2004, 83-84.

International Search Report issued in PCT/US2013/043503 on Dec. 23, 2013.

* cited by examiner

SEQUENTIAL CHARGING OF MULTIPLE ELECTRIC VEHICLES

CROSS-REFERENCE TO RELATED APPLICATIONS

This application claims priority to and is a continuation-in-part of pending U.S. Non-Provisional application Ser. No. 12/772,519, filed May 3, 2010, entitled "Plug-In Electric Vehicle Supply Equipment," which is a continuation-in-part of pending U.S. Non-Provisional application Ser. No. 12/646, 276, filed Dec. 23, 2009, entitled "Plug-In Electric Vehicle Supply Equipment," which claims priority to U.S. Provisional Application No. 61/229,104, filed on Jul. 28, 2009, entitled "Plug-In Electric Vehicle Supply Equipment." The priority is claimed to each of the above mentioned applications and each of the aforementioned applications are incorporated herein by reference in their entirety.

FIELD OF THE INVENTION

The present invention relates generally to providing power to recharge the batteries of battery electric vehicles and plug-in hybrid electric vehicles. More particularly, the present invention relates to electric vehicle power supply equipment to deliver Level I charging (up to 15 amps or 20 amps and 120 volts) and/or Level II charging (up to 80 amps and 240 volts) from an electrical socket, to one or more vehicles.

BACKGROUND OF THE INVENTION

Vehicles powered either fully or partially by batteries must at some point recharge their batteries. Particularly in the case of battery electric vehicles, the lack of an alternative power source, like one that a plug-in hybrid electric vehicle would have, causes the batteries to deplete faster and have a more limited range. Plug-in electric hybrids are generally less taxing on the batteries and built-in regenerative systems may suffice to recharge the batteries enough to go longer without having to plug-in the vehicle to recharge it. However, the driver will dictate the need for recharging an electric vehicle through the extent of use, driving conditions, and driving style. High mileage, stop-and-go traffic, and quick accelerations are all things that the driver may subject an electric vehicle to, and all will deplete the batteries faster than under ideal conditions.

The standard American electrical socket provides 120 volts A/C (alternating current). The common availability of the 120 volt A/C electricity supply makes it a convenient choice for the power supply for recharging the batteries of electric vehicles. Many garages, carports, or outdoor parking areas may currently have 120 volt A/C electrical outlets, or may easily have one added, so that the power source may be connected to the electric vehicle for Level I charging.

However, the 120 volt A/C electricity supply is often insufficient to recharge the batteries of an electric vehicle in a period of time to allow for convenient use of the electric vehicle. A full recharge may not even be completed overnight and partial recharges often take too much time to be practical. Providing a higher voltage electricity supply can greatly reduce the amount of time needed to recharge an electric vehicle. Such high voltage sources are available in homes and other locations, and may be used for Level II charging.

It is desirable to provide a convenient way of connecting the Level I or Level II electricity source to an electric vehicle to recharge the batteries thereby making recharging quicker and using an electric vehicle more practical. It is also desirable to provide a convenient way to plug the electric vehicle supply equipment to either a Level I or Level II electrical supply source using plugs and receptacles designed to meet National Electrical Code (NEC) and National Electrical Manufacturers Association (NEMA) standards, and with minimal duplication of components. This will reduce the cost of the product, installation, service repair, relocation and greatly simplifying the local electrical permitting process. This will also make the electric vehicle more practical, acceptable and provide a lower cost of ownership for the vehicle consumer.

SUMMARY OF THE INVENTION

At least in view of the above, it would be desirable to provide a system for connecting a high voltage electricity source to an electric vehicle to recharge its batteries. The foregoing needs are met, to a great extent, by certain embodiments of the present invention.

In one embodiment, an apparatus for sequential charging a plurality of electric vehicles is provided and can include a socket connector configured to couple with an electrical socket, a first power conduit having a first end connected to the socket connector and a plurality of distal ends, the first power conduit configured to convey a voltage from the electrical socket to the plurality of electric vehicles, a first relay placed inline with the first power conduit and configured to control the voltage along the first power conduit, a control circuit connected to the first power conduit and configured to generate signals corresponding to the voltage along the first power conduit, a plurality of vehicle connectors each connected to a respective one of the plurality of distal ends of the first power conduit and configured to connect to a respective one of the plurality of electric vehicles, and a second relay placed inline with the first power conduit and configured to control the voltage to the vehicle connectors to sequentially charge the plurality of electric vehicles.

In another embodiment, a method for sequential charging of multiple electric vehicles is provided and can comprise the steps of detecting if multiple vehicles are connected to an electric vehicle supply equipment (EVSE), determining a priority for providing charging power to a battery of a first or a second electric vehicle of the multiple electric vehicles via a processor based on information received from the first and second electric vehicles or from a user input via an input device, providing charging power to the battery of the first or second electric vehicle via a respective vehicle connector based on the priority determination by the processor, monitoring the charge level of the battery of the first or second electric vehicle via the processor, determining, via the processor, whether to discontinue charging the battery of the first priority electric vehicle being charged, and determining whether to provide charging power to the battery of the second priority electric vehicle of the multiple electric vehicles via the processor.

In still another embodiment, an apparatus for sequential charging of multiple electric vehicles is provided and can include a connecting means configured to couple with an electrical socket, a power conducting means having a first end connected to the connecting means and a plurality of distal ends, and the connecting means configured to convey a voltage from the electrical socket to the plurality of electric vehicles, a first relaying means placed inline with the power conducting means and configured to control voltage along the power conducting means, a controlling means connected to the power conducting means and configured to generate signals corresponding to the voltage along the power conducting means, a plurality of vehicle connecting means each connected to a respective one of the plurality of distal ends of the power conducting means and configured to connect to a respective one of the plurality of electric vehicles, and a second relaying means placed inline with the power conducting means and configured to control voltage to the vehicle connectors to sequentially charge the plurality of electric vehicles.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
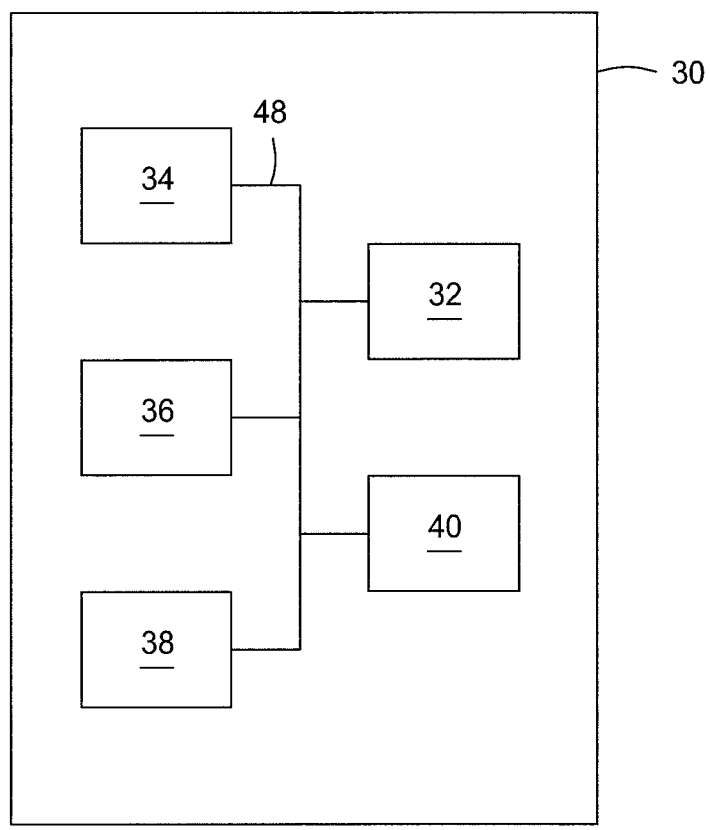
FIG. 1 is a block diagram view of an apparatus for connecting an electric vehicle to Level I or Level II power source according to an embodiment of the invention.

An embodiment of the present inventive system for connecting an electric vehicle, such as a battery electric vehicle (BEV) or a plug-in hybrid electric vehicle (PHEV), to a Level I or II power source (Level II power may also be referred to as high voltage) may include an apparatus, such as an electric vehicle supply equipment (EVSE) for connecting the electric vehicle to a power source. The EVSE may be employed to make a circuit connection to allow power from an electrical socket, like a wall socket, to flow to a charging circuit within the electric vehicle. The wall socket may be a standard outlet found in a residential garage or a socket at a powering station in or outside the residential garage. The power station may be positioned, for example, at a parking garage, at a public parking space, at a rest stop, a conventional gas station, or a powering station (similar to a gas station, but has power stations instead of gas pumps). Further, the EVSE may be constructed to at least meet industry standards, such as SAE J1772, UL 2594, and NEC Article 625. The SAE J2836 vehicle communication standard may also be considered in constructing the EVSE.

The EVSE may have a socket connector at a first end to couple the EVSE to the electrical socket, such as a wall socket, and a vehicle connector at a second end to couple the EVSE to the electric vehicle. Once coupled, to both the wall socket and the vehicle, the EVSE may allow passage of electrical current from the wall socket to the electric vehicle, thus recharging the electric vehicle's batteries. This embodiment allows for the use of standard electrical outlets instead of hardwiring the EVSE directly to a power source.

Level I and Level II sockets are different in configurations. The EVSE may be constructed and/or provided with adapters to make the EVSE compatible with both a Level I and II socket. This may be accomplished through a combination of internal hardware and/or electrical components, external wiring components, and plug components and/or adapters.

In addition, the EVSE may analyze signals and/or data received from the electric vehicle. Analyzing the signals and/or data may involve checking the electric vehicle for specific conditions. While analyzing, the EVSE may determine when to allow and when to prohibit the flow of current between the socket and the electric vehicle.

A user of an EVSE may require that the EVSE be able to charge more than one vehicle. In one embodiment the EVSE may be configured to charge the vehicles simultaneously. Other embodiments may include an EVSE which may charge vehicles sequentially in a number of different manners.

The invention will now be described with reference to the drawing figures, in which like reference numerals refer to like parts throughout.

FIG. 1 is a block diagram view of an apparatus for connecting an electric vehicle to Level I or Level II power source according to an embodiment of the invention. An EVSE 30 is one such apparatus and may include an input device 32, a memory 34, a communication device 36, a processor 38, and a display 40, some or all of which can be interconnected by a data link 48. The EVSE 30 can be a general computing device, such as a personal computer (PC), a UNIX workstation, a server, a mainframe computer, a personal digital assistant (PDA), a cellular phone, a smartphone, some combination of these or any other suitable computing device. Alternatively, the EVSE 30 can be a specialized computing device made up of components specifically chosen to execute the functionality of the EVSE 30. The remaining components can include programming code, such as source code, object code or executable code, stored on a computer-readable medium that can be loaded into the memory 34 and processed by the processor 38 in order to perform the desired functions of the EVSE 30.

The processor 38 may be executed in different ways for different embodiments of the EVSE 30. One embodiment is that the processor 38 is a device that can read and process data such as a program instruction stored in the memory 34 or received from a source on the electric vehicle. Such a processor 38 may be embodied by a microcontroller. On the other hand, the processor 38 may be a collection of electrical circuitry components built to interpret certain electrical signals and perform certain tasks in response to those signals, or an integrated circuit.

The memory 34 may include, for example, any form or combination of volatile, non-volatile, solid state, magnetic, optical, permanent, removable, writable, rewriteable, and read-only memory. The memory 34 may contain a number of program instructions for use with the EVSE 30. The instructions may include methods, for example, for controlling the flow of current between the electrical socket and the electric vehicle. These methods may include controlling when to allow or prohibit the flow of current, or perhaps moderate the flow of current. The flow of current can be controlled based on various factors such as when off peak rates of an electrical utility are in progress; the usage of power, for example, within a house, a building, a power grid, or a parking structure; the availability of current or if the current is constant; scheduled power outages; availability of raw materials that are used in generating electricity; the availability of alternative means of generating electricity; the weather at the local charging station or outlet, which can effect means of generating electricity, such as wind turbines, and solar panels and the like.

Further, the memory may contain software having instructions related to diagnosing vehicle functions, such as OBD-II, battery testing, tire pressure sensor testing, emissions testing and the like. Further, the software may include the ability to track the status of various batteries in the vehicles, such as which batteries have been replaced, the remaining battery life of the various batteries, the warranty information about the batteries, the type of batteries used in the vehicle (mix and match) and the like. Many other embodiments may provide for further methods, some of which will be discussed herein.

Additionally, an embodiment of the EVSE 30 can communicate information to a user through the display 40 and request user input through the input device 32 by way of an interactive, menu-driven, visual display-based user interface, or graphical user interface (GUI). The user may interactively input information using direct manipulation of the GUI. Direct manipulation can include the use of a pointing device, such as a mouse or a stylus, to select from a variety of selectable fields, including selectable menus, drop-down menus, tabs, buttons, bullets, checkboxes, text boxes, and the like. Nevertheless, various embodiments of the invention may incorporate any number of additional functional user interface schemes in place of this interface scheme, with or without the use of a mouse or buttons or keys, including for example, a trackball, a scroll wheel, a touch screen or a voice-activated system.

Some options that may be selected through the input device 32 may allow the user control over the charging of the electric vehicle. The user may select, for example, that the batteries be charged to or at a certain level or for a certain amount of time, a certain number of charges or start and stop at a certain time or at a particular event. Further, the user may select to be notified on a separate device, like on a cellular device, smart phone, pager, fax, remote control/display, or other wired and wireless devices, that the electric vehicle or charging is in a certain state, such as complete or faulted. The user may be able to set the EVSE 30 to control and power some of the vehicle's components while plugged in. For example, during different seasons the user may desire to heat or cool the vehicle as he gets ready for work in the morning so that the vehicle is comfortable when he gets in it. The EVSE 30 may also control setting the radio, power seats and mirrors depending on user preferences. Through the use of the EVSE 30, other devices like a GPS, radar detector, and other devices that require boot or warm up periods may be powered on before the user enters the electric vehicle.

The display 40 may have a more simple implementation than previously mentioned, consisting of one or multiple indicators. Such indicators may consist of a small liquid crystal display (LCD) that can depict text or graphics. The LCD may be monochrome or colored. Other embodiments may include a single or multiple light emitting diodes (LED). This implementation could work for transmitting a limited number of simple messages. An LED may emit a single color of light, or it may be able to emit a number of different colors. Each LED or color may be associated with a different message. Some messages may include that power is available to charge the electric vehicle batteries, that charging the electric vehicle batteries is in progress, that the charging is complete, and that there is a fault or problem. The display may also be used to indicate the level of charge for the batteries, the number of times the batteries have been charged and the remaining charging time or the time the batteries have been charging.

The display 40 may also be separate from the EVSE 30 or a second remote display can be utilized. The second remote display (not shown) can be a remote control panel that receives the same or similar information as the display 40. The second remote display can also control the EVSE 30 in the same or similar manner as the display 40 or the input device 32.

Figure 2A:
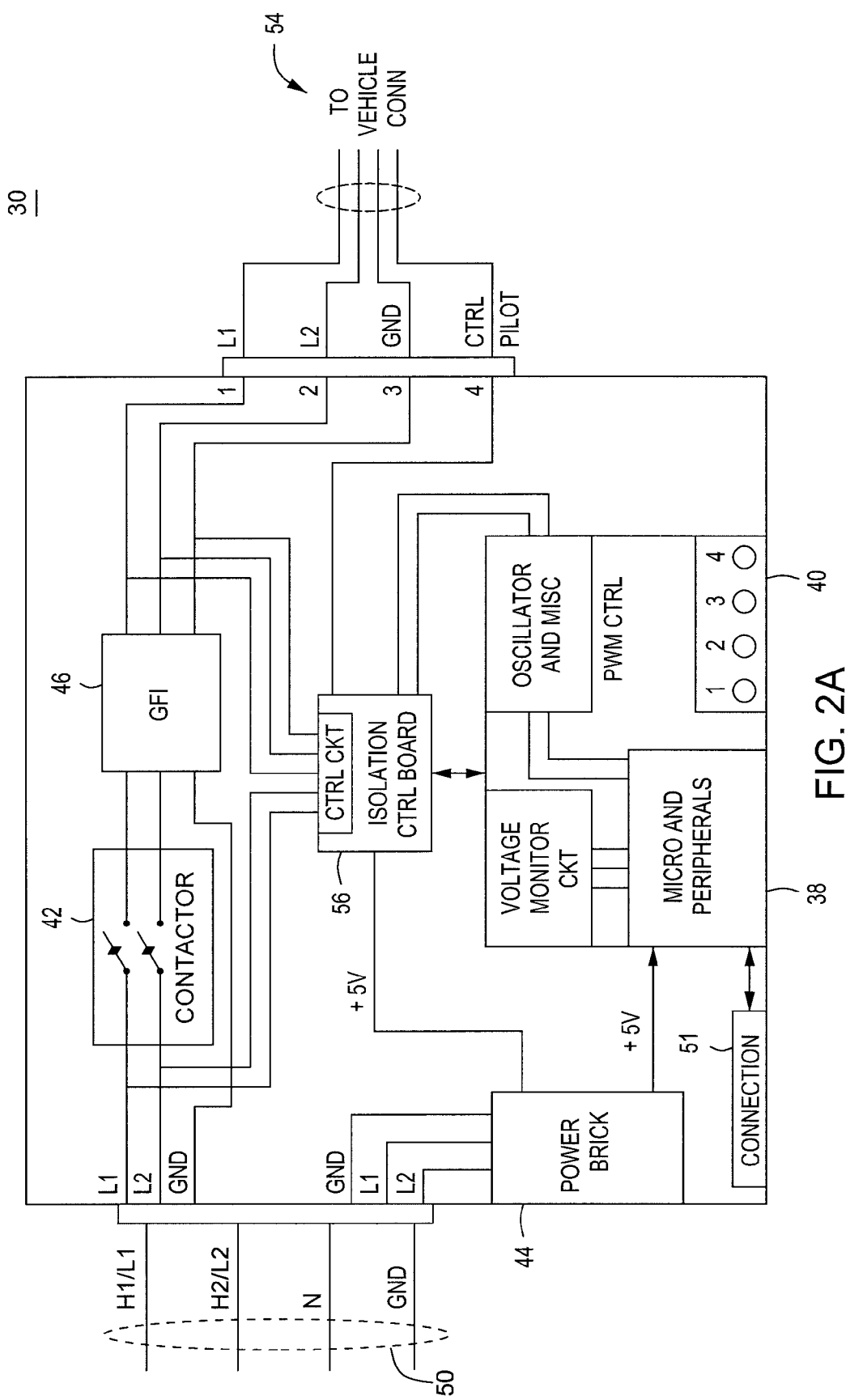
FIG. 2A is a schematic view of an apparatus for connecting an electric vehicle to a high voltage power source according to another embodiment of the invention.
Figure 2B:
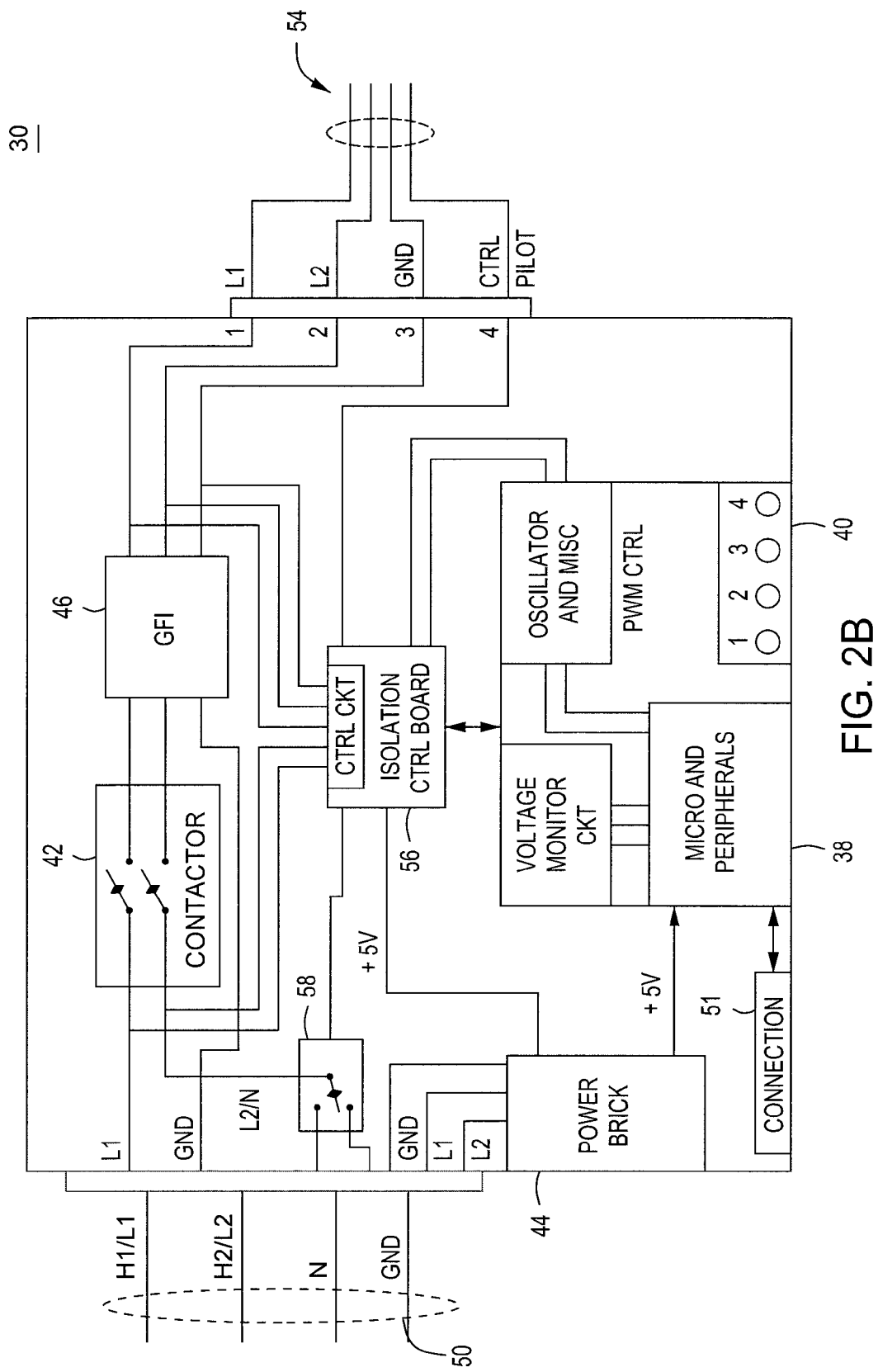
FIG. 2B is a schematic view of an apparatus for connecting an electric vehicle to a Level I or Level II power source according to another embodiment of the invention.

FIG. 2A is a schematic view of an apparatus for connecting an electric vehicle to a high voltage power source according to another embodiment of the invention. FIG. 2B is a schematic view of an apparatus for connecting an electric vehicle to a Level I or Level II power source according to another embodiment of the invention. The EVSE 30 may further include a relay 42 (referred to in FIGS. 2A and B as a contactor), a voltage regulating device 44 (referred to in FIGS. 2A and B as a power brick), a breaking device 46 (referred to in FIGS. 2A and B as a GFI), and a switch 58 (not shown in FIG. 2A), some or all of which may be connected by an electric conduit 50. A control circuit 56 may act as a buffer between different parts of the EVSE 30. At one end of the EVSE 30 is a socket connector 52 (FIG. 3) and at the other end is a vehicle connector 54 (also shown in FIG. 3 and explained herein).

The voltage regulating device 44 may be needed to power the electronic components of the EVSE 30. Since the EVSE 30 may draw its power from the same electrical socket it uses to charge the batteries of the electric vehicle, the EVSE 30 will be receiving high voltage electricity. The electrical socket may supply, for example 120 volts, 220 volts or 240 volts. The high voltage of the power drawn from the electrical socket could damage some of the electronic components of the EVSE 30. Thus, the voltage regulator device 44, such as a transformer or a voltage regulator, may be employed between to the electrical socket and the electrical components of the EVSE 30. The voltage may then be lowered to a level that is manageable to the electrical components, such as, for example, 5 volts or 12 volts. In other embodiments, the voltage regulator device 44 can increase the voltage as needed by the EVSE 30.

While the voltage regulating device 44 may regulate the voltage to parts of the EVSE 30, there are parts where electricity may flow unaltered from the electrical socket to the electric vehicle. An electric conduit 50 may run the length of the EVSE 30.

In one embodiment of the invention, the electric conduit 50 may be of the type having a gauge and/or rating such that it may appropriately handle the range of supplied current from the electrical socket. That being, the electric conduit 50 should be able to handle at least the highest supplied current, and in turn it will also be able to handle lower levels of current. The electric conduit 50 may be one appropriate for handling Level I and Level II charging or any level of charging. The electric conduit 50 suited for Level II charging may be comprised of a combination of conduits including, for example, two conduits for power supply (L1 and L2), one conduit as a neutral, and one conduit as a ground. The supplied current may be split over L1 and L2, thus aiding in supplying the proper current for Level I and Level II charging.

In connecting the electric conduit to the internal components of the EVSE 30, it may be convenient to connect some or all of the combination of conduits that make up the electric conduit 50 to the different internal components. For example, the voltage regulating device 44, as discussed herein, receives power from the supplied power from the electrical socket the EVSE 30 connects to. To receive this power, the voltage regulating device 44 may be connected to, at least, L1 and/or L2.

In one embodiment, the electric conduit 50 includes a relay 42 that may be placed to bridge segments of the electric conduit 50, allowing the EVSE 30 to start and stop the flow of current to the electric vehicle. The electric conduit 50 may optionally be connected to a voltage regulator to step up or step down the voltage passed to the electric vehicle. Further, to aid in providing the proper current to charge the electric vehicle, it is possible to provide the relay 42 with some or all of the current provided by the electrical socket. Power supply conduits L1 and L2 may both be connected to the relay 42. Alternatively, the relay 42 may be connected to only either conduit L1 or L2.

In an alternative embodiment, it may be that when only connected to conduit L1 or L2, the relay 42 may only enable the EVSE 30 to be able to provide the vehicle with Level I charging capabilities. Thus, to enable the EVSE 30 to provide Level II charging capabilities, as well as Level I charging, it maybe a possible to provide a switch 58 that will allow the EVSE 30 to selectively connect the unconnected conduit, either L1 or L2, to the relay 42. In one embodiment, the switch 58 may be connected to, at least, the conduit, either L1 or L2, not already connected to the relay 42. Further, the switch 58 may be connected to the control circuit 56 that controls when the switch allows for the selective connection of the unconnected conduit, either L1 or L2, to the relay 42. The control function will be discussed herein.

Also connected to the electric conduit 50 may be a breaking device 46 (also called a ground device, GFI, or a current monitor). The breaking device 46 is intended to cut power along the electric conduit 50 quickly so as to avoid harming a user with a high voltage electric shock, harming the components of the EVSE 30 or damaging the electric vehicle. Such a breaking device 46 may be a ground fault interrupter. If the breaking device 46 trips and cuts power, EVSE 30 may have an auto-reset function to attempt to restore the power transfer to the electric vehicle. The auto-reset function may attempt to restore the power transfer after a determined time and/or for a determined number of tries. The auto-reset functions allows for continuous charging of the vehicle should a power surge occurs while the user is asleep or away from the charging location.

The control circuit 56 may be connected to the electric conduit 50 and to the data link 48. Acting as a buffer between two portions of the EVSE 30, the control circuit may pass signals from the electric conduit 50 representing the voltage on the electric conduit 50 to the processor 38. From these signals, the processor 38 may react accordingly to control the relay 42 and the breaking device 46. Further, the processor 38, and other components, such as a voltage monitor, an oscillator, and a pulse width modulator may act accordingly to conduct a number of functions of the EVSE 30. The control circuit 56 may also be connected to the voltage control device 44 for power, and a control pilot pin of a vehicle connector (discussed herein) to pass on signals from the vehicle to the other components of the EVSE 30.

In the switch's 58 initial state, it will be open, thereby causing a disconnect between the unconnected conduit, either L1 or L2, and the relay 42. When the EVSE 30 is connected to a Level I electrical socket, the control circuit 56 would recognize that there exists a 120 volt drop between the powered conduit, either L1 or L2, and the neutral conduit of the electric conduit 50 and leave the circuit between the unconnected conduit, either L1 or L2, and the relay 42 open. Alternatively, when the EVSE 30 is plugged into a Level II electrical socket, then the control circuit 56 would recognize the power on the unconnected conduit and, either via a signal from the processor 38 or via logical circuitry, provide a signal to the switch 58 to close the circuit between the unconnected conduit and the relay 42. With the circuit closed, the relay 42 is connected to both power supply conduits, L1 and L2, of the electric conduit 50, and the EVSE 30 can provide the electric vehicle with Level II charging capabilities.

The EVSE 30 also includes peripheral connection 51 that can add additional functionality to it, including USB, Fire-Wire, card reader, vehicle connector interface (for OBD-II, and the like connections), CD, DVD, memory, wireless communication, and additional hardware and software. The EVSE's software can be updated via the peripheral connection 51. Additional hardware can be added to include, for example, additional processor, memory, FPGA (field programmable gate array), ASIC, pin connections, multiplexor and the other hardware to expand the functionality of the EVSE 30.

Figure 3:
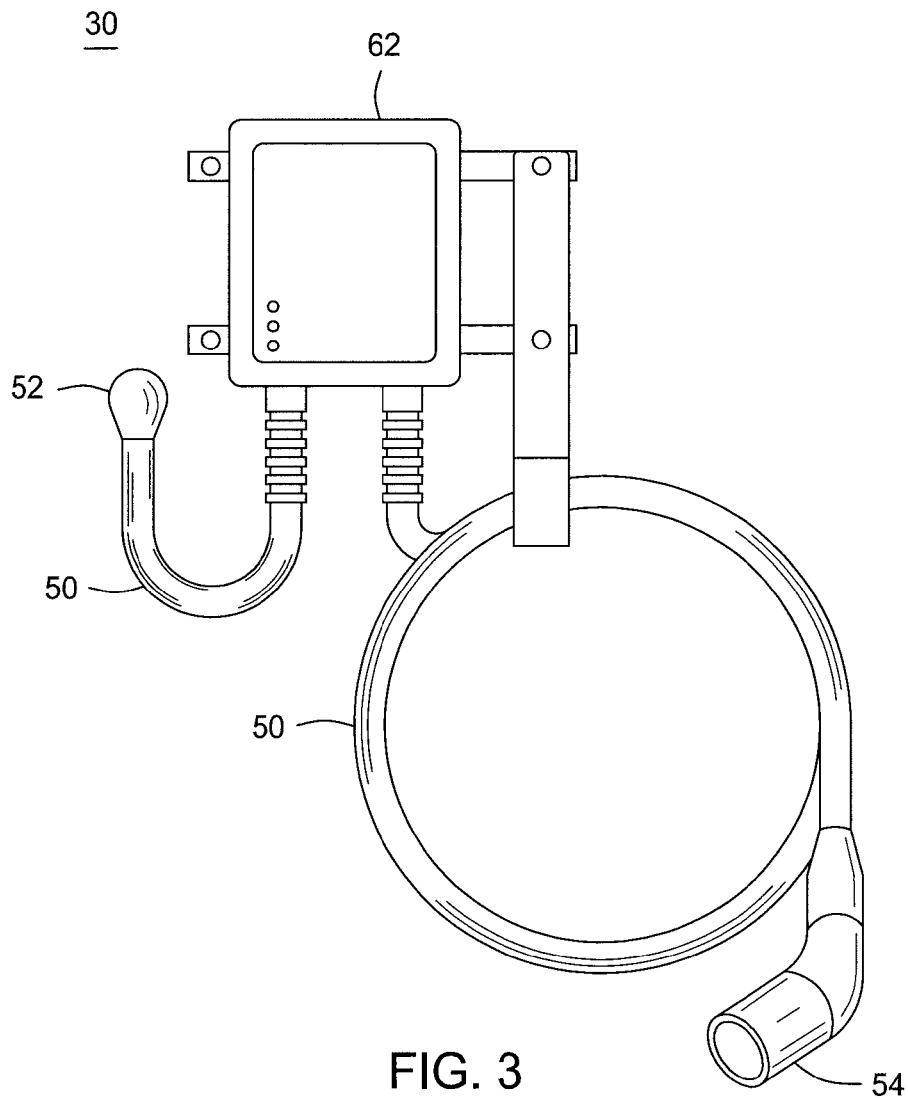
FIG. 3 is an elevation view of an apparatus for connecting an electric vehicle to a Level I or Level II power source according to another embodiment of the invention.

FIG. 3 is an elevation view of an apparatus for connecting an electric vehicle to a Level I or Level II power source according to another embodiment of the invention. Attached to a respective end of the electric conduit 50 may be the socket connector 52 and the vehicle connector 54. The socket connector 52 may couple with the electrical socket to allow electricity to flow to the EVSE 30. Any of a number of available or proprietary connectors may be used for the socket connector 52. Such available connectors may include a NEMA 5 plug, for example, a NEMA 5-15 plug for Level I charging, or a NEMA 14 plug, for example, a NEMA 14-50P plug for Level II charging, if appropriate for the electrical socket. These socket connectors 52 may be interchangeable. Alternatively, the socket connector may be of an appropriate type for Level I or Level II charging, and an adapter 60 may be used to adapt the socket connector 52 to work for the other type of charging, as discussed herein. Connected to the opposite end of the electric conduit 50 may be the vehicle connector 54, which also may be any number of available or proprietary connectors. One such example of a vehicle connector 54 may be a five-pin connector including two power pins, a ground pin, a control pilot pin, and a proximity sensor pin as specified in the SAE standard J1772 and designed by Yazaki of North America.

The EVSE 30 may include a housing 62. The housing 62 may encase a number of the components of the EVSE 30, for example, all the components previously mentioned except for portions of the electric conduit 50, the socket connector 52 and the vehicle connector 54. A bracket may be attached to the housing 62 to mount the housing 62 on a vertical surface such as a wall or post. The housing 62 or bracket may further include a hook to hang the power conduit 50. Alternatively, the power conduit may be retractable into the housing 62.

The EVSE 30 may be available for both indoor and outdoor applications. Proper weather proofing may be part of the housing to protect the components from damage and the users from injury. Some outdoor installations of the EVSE 30 may include burial in the ground, being attached to a post, or integrated into a pedestal.

Figure 4:
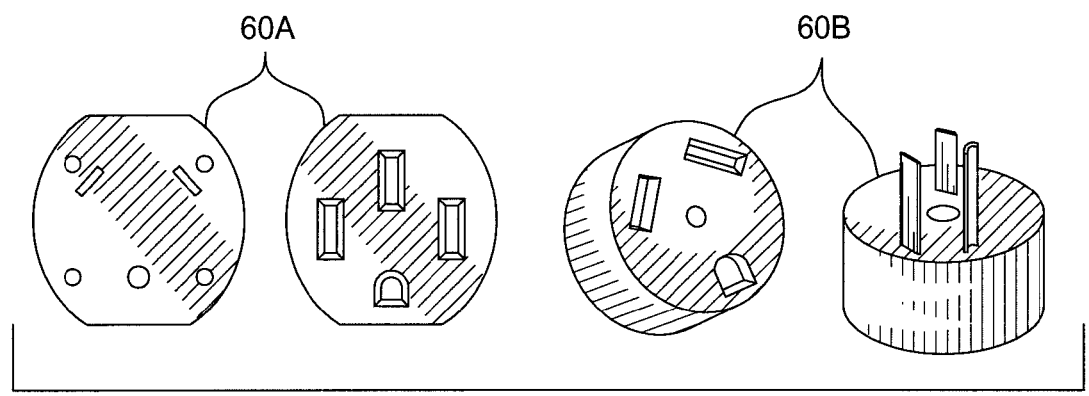
FIG. 4 illustrates adapters for connecting an apparatus that connects to a Level I or Level II power source according to another embodiment of the invention.

FIG. 4 illustrates adapters 60A and 60B for connecting an apparatus that connects to a Level I or Level II power source according to another embodiment of the invention. If the socket connector 52 is, for example, a NEMA type 5 plug suitable for Level I charging is at the end of the electric conduit 50, and it is desired to plug the EVSE 30 into a Level II socket, then the adapter 60A is configured to accept the prongs of the socket connector 52 (with NEMA type 5 plug) and has prongs configured to be inserted into a Level II socket. Alternatively, if the socket connector 52 is, for example, a NEMA type 14 plug suitable for Level II charging is at the end of the electric conduit 50, and it is desired to plug the EVSE 30 into a Level I socket, then the adapter 60B is configured to accept the prongs of the socket connector 52 (with NEMA type 14 plug) and has prongs configured to be inserted into a Level I socket. An example of an adapter 60B that would allow for connecting the socket connector 52 configured to connect to a Level II socket to connect to a Level I socket is the Marinco 50A to 15A RV Pigtail Adapter 150SPPRV.

Referring back to FIG. 1, in various embodiments, the EVSE 30 can be coupled to a communication network. The communication network allows for communication between the EVSE 30 and a remote device. The EVSE 30 can be coupled to the communication network by way of the communication device 36 which in various embodiments can incorporate any combination of devices—as well as any associated software or firmware—configured to couple processor-based systems. Such communication devices 36 may include modems, network interface cards, serial buses, parallel buses, LAN or WAN interfaces, wired, wireless or optical interfaces, and the like, along with any associated transmission protocols, as may be desired or required by the design.

The communication network links the communication device 36 of the EVSE 30 with the remote device. Various embodiments of the communication network may include any viable combination of devices and systems capable of linking computer-based systems, such as USB; Bluetooth; WiFi; ZigBee; power line communication (PLC); home area network (HAN); Silver Spring network; stable election protocol (SEP); the Internet; TCP/IP; an intranet or extranet; a local area network (LAN); a wide area network (WAN); a direct cable connection; a private network; a public network; an Ethernet-based system; a token ring; a value-added network; a telephony-based system, including, for example, T1 or E1 devices; a cellular telephony system, for example, GPRS or GSM; an Asynchronous Transfer Mode (ATM) network; a wired system; a wireless system; an optical system; a combination of any number of distributed processing networks or systems or the like.

The remote device may be a common remote device, such as a electronic control unit of a vehicle, an example of which often used in vehicles for receiving diagnostic signals such an OBD-II signals. The remote device may also be a proprietary remote device, such as one developed for use with a specific brand of engine or specific model of engine. Further embodiments may encompass the remote device being a data receiver for a tire pressure management system. In either of these cases, the communication device 36 may be able to connect with a dealer, manufacturer, service department, government entity such as a state inspection office, etc. and report the findings transmitted from the remote device.

Moreover, the remote device may be a wireless device with a display that gives the user information about the status of the electric vehicle connected to the EVSE 30. The remote device may be such that it is easily placed within a room in a building, or even attached to a key like a key chain. The information delivered to the user may include charge status of the vehicle, diagnostic messages, tire pressure management system messages, and other vehicle related information.

The EVSE 30 may also act as a remote control allowing the user to control function of the car, like power, air conditioning and heat, radio settings, power seat and mirror settings, etc. The EVSE 30 may also have internet access or similar communication access to remote server in order to obtain information such as emails, weather report, web pages, stock information, diagnostic databases and the other information.

The communication device 36 may also be able to communicate with the local utility company. This may allow for the utility company to know that the vehicle is connected and to charge the vehicle at a certain time of the day, such as during off-peak hours, if requested by the user. One embodiment to implement this feature is through the remote device, where the remote device encompasses a smart meter or a computerized utility meter. The EVSE 30 may communicate with the smart meter to determine when the EVSE 30 should charge the vehicle depending on certain parameters. If it is a goal to reduce energy costs, the smart meter may determine at what time of the day the rate for electricity is lowest, and during that time, tell the EVSE 30 to charge the vehicle. The EVSE 30 may also communicate with the smart meter to indicate when the vehicle is charging and how much charging is required. With this information the smart meter may be able to manage the power consumption of the rest of a house to keep overall power consumption at or herein a desired level.

A further embodiment of the EVSE 30 may be to include a battery charging monitor. This feature could add a further layer of safety to the EVSE 30 by preventing overheating of the charging battery by, for example, decreasing the amount of electricity to the vehicle or simply terminate the electrical supply to the vehicle. The EVSE 30 may be able to connect to the vehicle's own battery temperature sensor, such as a thermistor or a laser temperature sensor. Signals from the temperature sensors may be interpreted by the EVSE 30. If the signals indicate that the temperature of the battery is rising to an undesired temperature, the EVSE 30 may discontinue charging the battery, and in some instances issue a notification of the problem to the user.

Other embodiments of the EVSE 30 may allow for the power conduit 50 to have multiple vehicle connectors 54 stemming therefrom, or multiple power conduits 50, each with its own vehicle connector 54 or a combination thereof. The EVSE 30 may charge the vehicles simultaneously or switch from one vehicle to another after the first vehicle has completed recharging. There may also be an adapter that allows the socket connector to connect to low voltage sockets, such as ones that provide 120 volts or less, as discussed herein. In other embodiments, the EVSE 30 can connect to alternative power sources that use renewable energy to charge the vehicle. Such sources may include solar panels and wind turbines, for example. If the alternative power sources alone are insufficient, then they may be supplemented by an electrical socket connected to a utility company source.

In an embodiment where the EVSE 30 is configured to charge more than one vehicle simultaneously, as mentioned herein, the EVSE 30 may have multiple power conduits 50, each with its own vehicle connector 54. An EVSE 30 connected to a power source, such as an electrical socket, may divide the power provided by the source and provide a certain percentage of the power to each vehicle via the respective power conduit 50 and vehicle connector 54 connected to each vehicle. In the simplest implementation of such an embodiment, the power could be split 50/50, with half of the power provided to each vehicle for charging.

Not all simultaneous charging need be so symmetric. An EVSE 30 configured for simultaneous charging may include power management features that allow the EVSE 30 to increase or decrease the power provided to the individual vehicles depending on various factors. For example, a situation may exist where a first vehicle is connected to the EVSE 30 before a second vehicle. While the first vehicle is charging alone, it may be allocated all of the power available for charging, i.e. 100% power. Once the second vehicle is connected to the EVSE 30, some of the 100% power allocated to the first vehicle may be reallocated to the second vehicle, making the power split, for example, 50/50, 70/30, 45/55, or any other combination.

The amount of power allocated to each vehicle may vary for multiple reasons. One may be the charge state of the battery in the respective vehicle. The EVSE 30 may be able to tell the level of charge remaining in the battery of each vehicle. If one vehicle battery has a higher charged level than the other, then the EVSE 30 may determine to provide the vehicle battery with the lower charged level more power. This determination may be made on the basis that the battery with the lower charge may require more power to charge it faster, while the battery with more remaining charge could finish charging in an adequate time with less power. The reverse of this power distribution may occur in the same situation depending on the power management settings. The EVSE 30 may determine that it may be more efficient, to provide the vehicle battery with a higher charged level with more power than the other battery to more quickly complete the higher charged battery's charging. Then, once the higher charge battery is done charging, or at a certain level, the EVSE 30 may allocate more power to the lower charged battery to complete charging.

During simultaneous charging, the charge levels of the batteries change. The EVSE 30 may have the ability to detect these charge levels and manage the power provided to each battery throughout the charging. For example, when a battery is charging, there may come a point in the charging cycle where the battery is approaching a full charge. Often at this point, charging power to the battery is reduced to until the battery is fully charged. In many instances, the reduction of charging power may occur in stages, each stage further reducing the charging power. If one battery were to reach this point before another charging battery, then the power management system could reallocated the power no longer needed for one battery to the other.

Further, the EVSE 30 does not have to deliver 100% of the charging power to any of the batteries, alone or combined, during charging. There may be times, when none of batteries require enough charging power to equate to 100% of the available charging power. In such instances, the EVSE 30 may be able to control the amount of power delivered to the batteries such that the delivered power totals less than the available charging power, for example, 15/20 or any other combination less than 100%.

Another factor that may affect how the EVSE 30 allocates the charging power to the vehicles may have to do with the battery technology implemented within the vehicles themselves. The EVSE 30 may be able to identify the battery technology used in a specific vehicle and determine that the vehicle charging is best effected using a specific charging profile, or the vehicle may be able to instruct the EVSE 30 to use a specific charging profile based on the battery technology, charge state, weather conditions, availability of accessible charging and/or gas stations within a given driving range, or other factors. Any information used to identify the battery technology, the vehicle, the battery charge state, or any other feature of the vehicle and/or battery may be detected or received by the EVSE 30 via the communication device 36 over the communication network. The EVSE 30 may connect to the vehicle wirelessly or by wire, for example via OBD II connector or the vehicle connector 54.

The allocation of electricity, detection of battery level, and the type of battery system that is in the vehicle and other detection discussed herein can be done automatically when the EVSE is connected to the vehicle. Alternatively, the allocation and detection can be predetermined and manually set by the user.

As stated above, the allocation of charging power may also be determined by customizable settings. One such setting, which may be user programmable to the EVSE 30 via the input device 32 or the remote device, is a vehicle priority setting. The EVSE 30 may be instructed that one vehicle has priority over another, thus the prioritized vehicle should complete charging before the other vehicle. For example, one user may go to work earlier than another user or one user anticipate only a lower usage of the vehicle on a particular day but may need more charging on another day. Other settings may indicate, for example, when the next time the vehicle will be used, how far the vehicle will be driven, the conditions the vehicle will be driven in (hills or no hills, mainly during high traffic times or not, for example), how economical the user wishes the EVSE 30 to be when charging the vehicle, a minimum charge level the user wishes the car to be at, the current or forecasted weather, the availability of accessible charging and/or gas stations within a given driving range, or any other factors that may affect how the EVSE 30 may allocate the charging power to meet the charge level needed, indicated by the settings, for the next use of the vehicle.

Sequentially charging multiple vehicles is another option for an EVSE 30 charging more than one vehicle. The simplest approach would be to configure the EVSE 30 to charge the vehicle it is connected to first until completion and then charge another vehicle thereafter. This could be implemented in a semi-manual fashion where the EVSE 30 has one power conduit 50 and one vehicle connector 54, and the EVSE 30 signals a user when one vehicle is charged and the EVSE 30 is available to be connected to another vehicle for charging. Another option would be to configure the EVSE 30 with multiple power conduits 50 having respective vehicle connectors 54. In one embodiment, there can be one power conduit 50 having multiple vehicle connectors 54 stemming therefrom.

With multiple vehicle connectors connected to respective vehicles, the EVSE 30 could be configured to automatically sequentially charge the vehicles. One implementation, similar to the sequential charging described herein, would be when completing the charging of a connected vehicle, the EVSE 30 could automatically charge another vehicle when finished charging the first one.

Sequential charging could be implemented in a number of other ways as well. Some embodiments of sequential charging would not require that the first vehicle charging be fully charged prior to reallocating power from the first vehicle to the second vehicle. Some batteries can be quickly charged with high power at first, thereby charging a certain percentage of the battery's charge potential. Often that portion of the battery's charge potential that can be quickly charged is a majority of the charge potential or a predetermined charge level. The remaining charge potential of the battery may require slower charging at a lower power level, including a trickle level. In instances where the vehicles being charged possess these types of batteries, the EVSE 30 may charge a substantial portion of the battery of the first vehicle until a quick charge potential threshold has been reached. Once the quick charge threshold of the first vehicle is reached, the EVSE 30 may discontinue power to the first vehicle (or charge at a lower level) and reallocate the power (or most of the power) to the second vehicle. When the EVSE 30 determines that the second vehicle has reached a satisfactory charge level, the EVSE 30 may discontinue power to the second vehicle and reallocate the power, at an appropriate level, to the first vehicle. This process of switching the allocation of power between the first and second vehicle may occur numerous times depending on power management settings implemented in the EVSE 30, based on efficiency, speed, economy, weather, availability of charging and/or gas station, or other factors.

The switching of power allocation between charging vehicles during sequential charging may occur for various reasons. One such reason is the EVSE 30 can be configured to detect the remaining charge levels of the connected vehicles. If the first vehicle is already connected and charging when the second vehicle is connected, the EVSE 30 may be able to compare the remaining charge level of each vehicle. In one instance, the EVSE 30 may determine that the first vehicle's remaining charge level is lower than the second vehicle. Then, depending on power management settings, the EVSE 30 may determine to continue charging the first vehicle until it reaches a satisfactory charge level, which may include a completed charge or a partial charge, before reallocating some or all power to the second vehicle. Conversely, the EVSE 30 may determine to discontinue charging the first vehicle and reallocate power to the second vehicle until a satisfactory charge level is reached before continuing to charge the first vehicle. This may be due to the need of the second vehicle earlier then the need of the first vehicle. The same charging determinations can be made by the EVSE 30 when the second vehicle's remaining charge level is lower than the first vehicle.

The satisfactory charge levels mentioned herein may be at any level of charging. A vehicle's battery may reach multiple satisfactory charge levels throughout the sequential charging process causing the EVSE 30 to discontinue charging one vehicle and allocate the charging power to another vehicle several times. The satisfactory charge level for each vehicle battery may depend on a single factor or multiple factors. Some such factors may include: battery charge state, battery type, charging method, charging efficiency, charging cost, charging speed, weather, availability of charging and/or gas stations en route, user settings (described herein), or a number of other factors. Similar factors may also be used for the EVSE 30 to determine the level of power to provide when charging a battery.

As described herein the allocation of charging power may also be determined by customizable settings. One such setting, which may be user programmable to the EVSE 30 via the input device 32 or the remote device, is the vehicle priority setting. The EVSE 30 may be instructed that one vehicle has priority over another, thus the prioritized vehicle should complete charging before the other vehicle. Other settings may indicate, for example, when the next time the vehicle will be used, how far the vehicle will be driven, the conditions the vehicle will be driven in, how economical the user wishes the EVSE 30 to be when charging the vehicle, the minimum charge level the user wishes the car to be at, the availability of charging and/or gas stations in the proximity of a path of travel, or any other factor that may affect how the EVSE 30 may allocate the charging power to meet the charge level needed, indicated by the settings, for the next use of the vehicle.

Many of the EVSE's capabilities described in connection with the simultaneous charging description are similarly applicable to sequential charging. In both embodiments the EVSE 30 may be able to detect or receive the same information from the vehicles, and make the same determinations about the vehicles and power management. However, instead of adjusting power levels to multiple vehicles at the same time as in the simultaneous charging, in sequential charging the EVSE 30 adjusts power levels to the charging vehicle and determines when to discontinue charging the charging vehicle and begin charging the other vehicle.

Another embodiment may include the EVSE 30 in communication with a remote server. The remote server may provide instructions to the EVSE 30 or it may just store information, such as in a database, and provide the EVSE 30 with requested information including performing other functions such as sending emails, as requested by the EVSE. In the embodiment where the remote server provides the EVSE 30 instructions, the EVSE 30 may pass information received, extracted, or sensed from the charging vehicle to the remote server. The remote server may then interpret that information and make the charging determinations described herein, such as if a vehicle battery has reached a satisfactory charge level, detect the remaining charge level, and determine when to discontinue charging and reallocate power. The remote sever may also store and take into account the power management settings and user settings. After interpreting the information, the remote server may then instruct the EVSE 30 to implement the different functions described herein.

In the embodiment where the EVSE 30 is connected to a remote server storing a database for providing information requested, the EVSE 30 may have the hardware and software to interpret the information and make the determinations described herein. An example of this would be when the EVSE 30 is connected to the vehicle for charging and basic information is available about the vehicle's make and model, or about the type of battery employed in the vehicle. The EVSE 30 may query the database on the remote server for more detailed information about the vehicle's battery, such as preferred battery charging methods and battery charging thresholds. The database may also be queried for power management settings and user preferences. The EVSE 30 may then use the information queried to make the vehicle charging related determinations.

The remote server may also serve to update software and information stored on the EVSE 30. In the embodiments where the EVSE 30 contains the charging determination software and/or the information used by the charging determination software, such as vehicle information, power management settings, weather, traffic, charging and/or gas station locations, and user preferences, the remote server may update the software and information stored on the EVSE 30.

Figure 5:
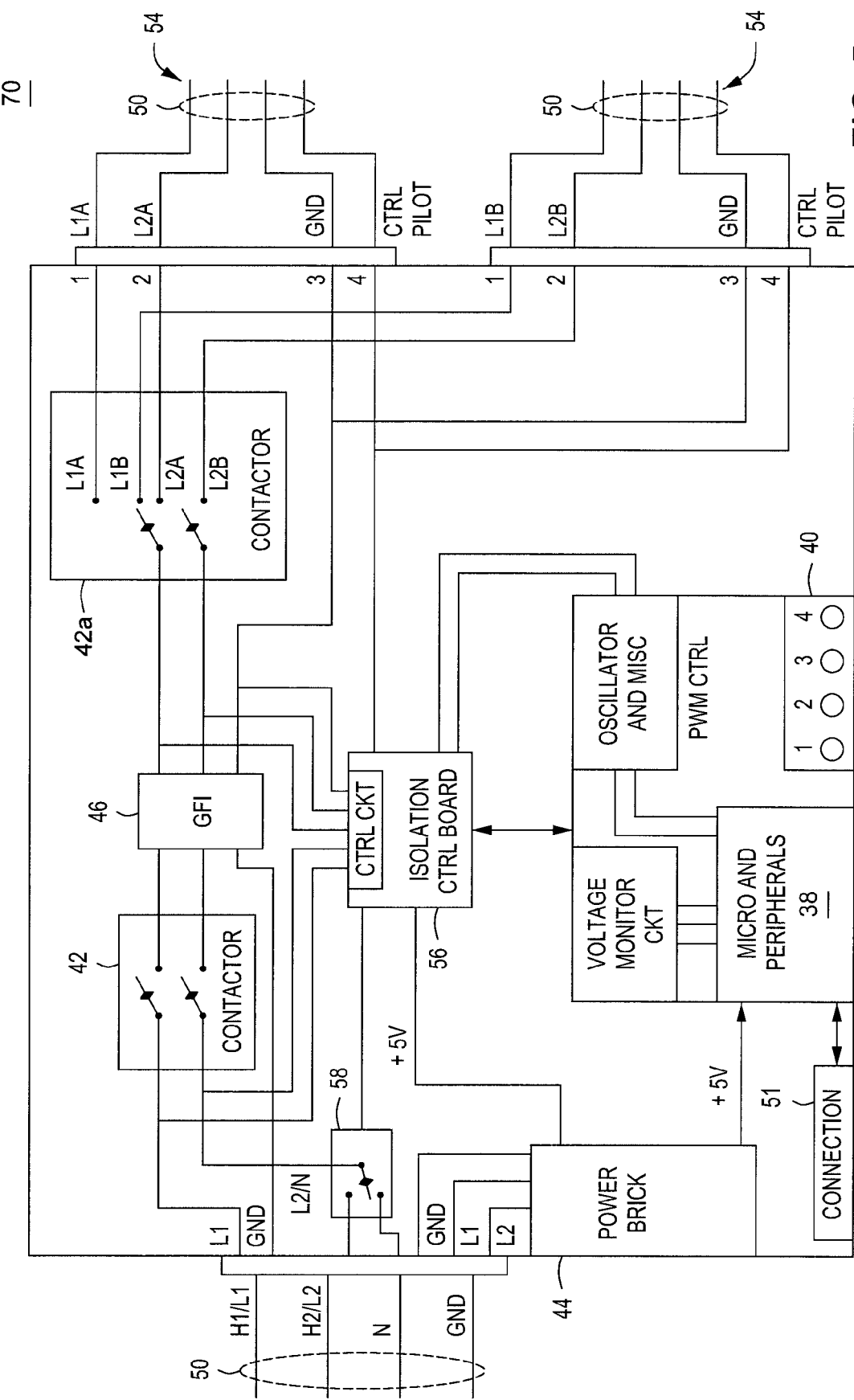
FIG. 5 illustrates schematic view of an apparatus for sequential charging of multiple electric vehicles according to another embodiment of the invention.

Referring now to FIG. 5, illustrated is a schematic of an apparatus for sequentially charging multiple electric vehicles. The apparatus depicted, herein the sequential EVSE 70 is much like the EVSE 30 described herein with a few modifications. The sequential EVSE 70 may include multiple vehicle connectors 54, connected to the rest of the sequential EVSE 70 by a respective power conduit 50. There may also be another contactor 42a between the breaking device 46 and the vehicle connectors 54 for controlling the power to each vehicle connector 54. Further, the EVSE 70 may include another voltage regulator device (not shown) to a manipulate the voltage levels provided to the vehicle connector 54.

Figure 6:
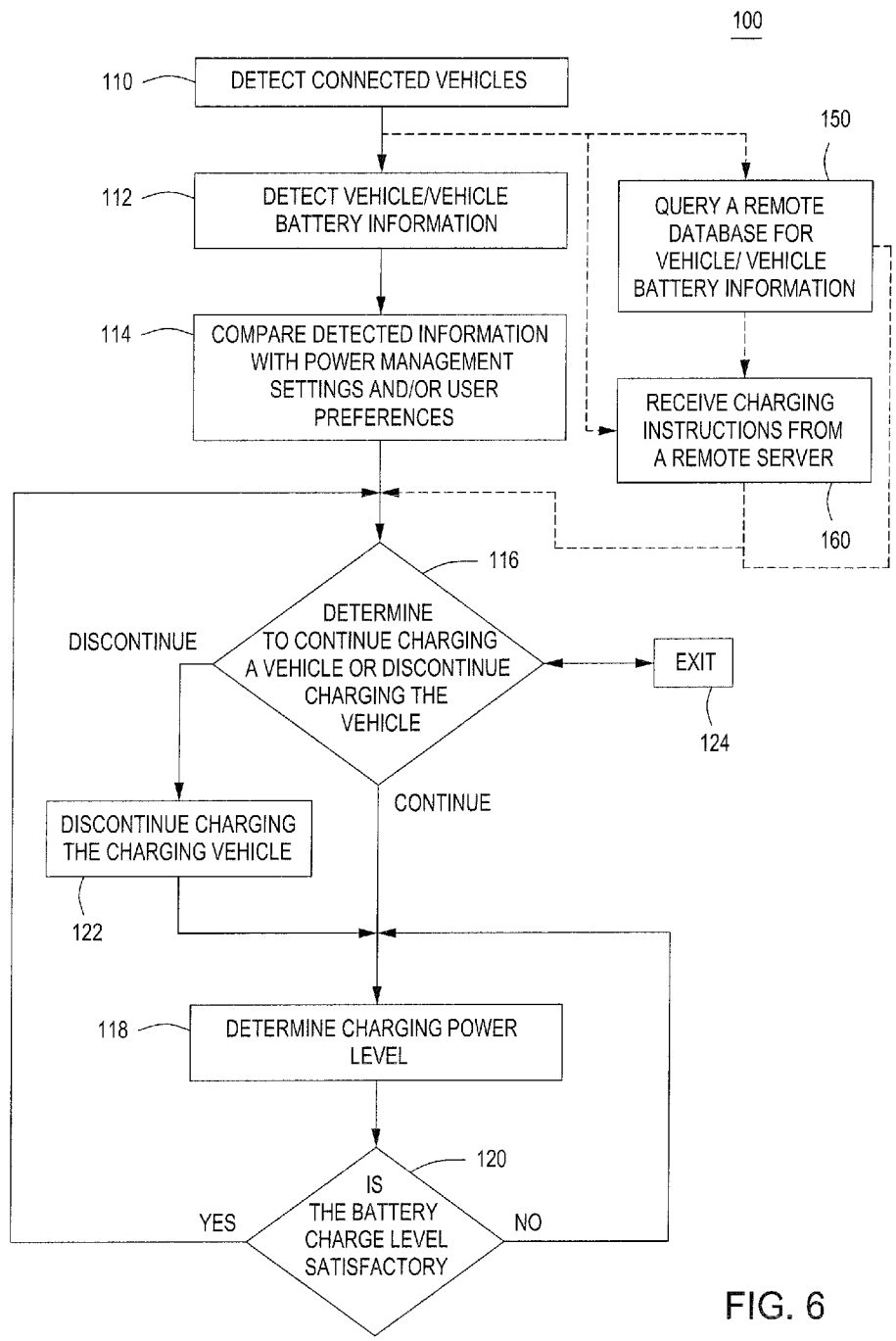
FIG. 6 illustrates a method for sequential charging of multiple electric vehicles according to another embodiment of the invention.

Referring now to FIG. 6, illustrated is a flow diagram of a method for sequentially (or simultaneously) charging multiple electric vehicles 100 according to an embodiment of the invention. First, the EVSE 30 may detect that multiple vehicles are connected to it via the vehicle connectors 54 (step 110). Detecting that multiple vehicles are connected may be conducted by polling the vehicle connectors 54 to see if they are connected to a vehicle, or the EVSE 30 may wait to receive a signal once the vehicle connectors 54 are connected to the vehicles. The signal may be automated or as a result of an entry by the user. Once the EVSE 30 detects multiple vehicles, the EVSE 30 may detect vehicle/vehicle battery information (step 112). Optionally the EVSE 30 may query the remote database for information, such as about the vehicle battery, power management settings, and/or user settings (step 150). In another embodiment, an option may be for the EVSE 30 to pass information to a remote server to process the information and instruct the EVSE 30 on how to manage the charging of the vehicles (step 160). This may be due to the user remotely entering charging information on the remote server for the EVSE to access at a later point in time. The user would access the remote server and enter the desired information for the EVSE to use during charging.

The EVSE 30 may then compare any information detected from the first vehicle/vehicle battery with information from the second vehicle/vehicle battery, power management settings, and/or user settings (step 114). After making such comparisons, the EVSE 30 may determine, whether to continue any charging in progress, discontinue charging in progress and begin charging a different vehicle, simultaneously charge the vehicles, or exit (step 116). If the EVSE continues to charge, then the EVSE 30 determines the amount of power to allocate to charging (step 118) one vehicle versus the other, i.e. charging only on vehicle at a certain level or charging both vehicles at respective levels. While charging, the EVSE 30 monitors the charge level of the charging vehicle battery for the charge level (step 120). If the charge level is satisfactory, the process returns back to step 116, otherwise the charging continues.

Back at step 116, if the EVSE 30 determines to discontinue the charging in progress and begin charging a different vehicle, then the EVSE discontinues power to the charging vehicle (step 122). The EVSE 30 then determines the amount of power to allocate to charging the charging vehicle (step 118). While charging, the EVSE 30 monitors the charge level of the charging vehicle battery for the charge level (step 120). If the charge level is satisfactory, the process returns back to step 114, otherwise the charging continues.

If, at step 116, the EVSE 30 determines that all connected vehicles have completed charging, then the EVSE 30 exits the sequential method for sequentially charging multiple electric vehicles 100 (step 124).

As stated herein, the EVSE may potentially perform a variety of other functions in addition to its primary purpose of charging the electric vehicle. Multiple embodiments may also include any number of functions that may be considered secondary purposes of the EVSE. A few examples of these functions may include conducting battery tests and reporting the state of the batteries and the number of times the batteries have been charged. The EVSE may also conduct vehicle diagnostics, execute a tire pressure management system, run an emissions analysis, etc.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An apparatus for charging a plurality of electric vehicles, comprising:
    a socket connector configured to couple with an electrical socket;
    a first power conduit having a first end connected to the socket connector and a plurality of distal ends, the first power conduit configured to convey an AC voltage from the electrical socket to the plurality of electric vehicles;
    a first relay placed inline with the first power conduit and configured to control the AC voltage along the first power conduit;
    a control circuit connected to the first power conduit and configured to generate signals corresponding to the AC voltage along the first power conduit;
    a plurality of vehicle connectors each connected to a respective one of the plurality of distal ends of the first power conduit and configured to connect to a respective one of the plurality of electric vehicles to provide the AC voltage to the plurality of electric vehicles;
    a second relay placed inline with the first power conduit and configured to control the AC voltage to the plurality of vehicle connectors to charge the plurality of electric vehicles;
    a processor connected to the control circuit and configured to receive signals from and send signals to the control circuit and to control whether to continue charging, discontinue charging, begin charging a different vehicle, or simultaneously charge the vehicles;
    a voltage monitor connected to the processor;
    a pulse width modulator connected to the processor;
    a display connected to the processor; and
    a switch connected to the first power conduit and the first relay, wherein the processor is configured to control the switch in order to provide a level I or level II voltage to the plurality of electric vehicles.

2. The apparatus of claim 1 further comprising a communication device configured to connect to a remote server, wherein the remote server is configured to store a database and provide information in response to a query by the processor.

3. The apparatus of claim 1 further comprising a communication device configured to connect to a remote server, wherein the remote server is configured to receive information from the processor, process the information, and provide instructions to the processor.

4. The apparatus of claim 1, wherein the processor is configured to control the second relay in order to provide AC voltage to the plurality of vehicle connectors so that one of the plurality of electric vehicles is charged at a first rate while a second of the plurality of electric vehicles is charged at a second rate.

5. The apparatus of claim 4, wherein the processor is further configured to control the second relay based on power management settings stored on a memory.

6. The apparatus of claim 4, wherein the processor is further configured to control the second relay based on power user settings received via an input device.

7. The apparatus of claim 2, wherein the processor is further configured to control the second relay based on weather information received via the communication device.

8. The apparatus of claim 4, wherein the processor is further configured to control the second relay based on the availability of charging stations or gas stations proximate to a planned route of travel received via an input device.

9. The apparatus of claim 1, wherein the processor is configured to control the second relay in order to provide AC voltage to a first or second electric vehicle based on a battery type that is in the first or second electric vehicle.

10. The apparatus of claim 1 further comprising a voltage regulator configured to step up or step down the voltage provided to the plurality of vehicle connectors.

11. The apparatus of claim 1, wherein the control circuit is configured to monitor voltage on the first power conduit and to determine if there is a level II voltage present and to control the switch so that the plurality of electric vehicles receives level II voltage.

12. The apparatus of claim 1, wherein the processor determines based on an information received from the plurality of vehicles which of the plurality of vehicles to charge and at what rate.

13. The apparatus of claim 1, wherein the plurality of distal ends of the first power conduit further comprises a second power conduit.

14. A method for charging multiple electric vehicles, comprising:
    detecting if multiple electric vehicles are connected to an electric vehicle supply equipment (EVSE);
    determining a priority for providing charging power to a battery of a first or a second electric vehicle of the multiple electric vehicles via a processor based on information received from the first and second electric vehicles or from a user input via an input device;
    providing charging power to the battery of the first or second electric vehicle via a respective vehicle connector based on the priority determination by the processor that is connected to a pulse width modulator;
    monitoring a charge level of the battery of the first or second electric vehicle via the processor, wherein a voltage monitor and a display are connected to the processor;
    determining, via the processor, whether to continue charging the battery of the first electric vehicle being charged, discontinue charging the battery of the first electric vehicle being charged, or simultaneously charge the first electric vehicle and the second electric vehicle;
    controlling, by the processor, a switch connected to a first power conduit and a first relay in order to provide a level I or level II voltage to the multiple electric vehicles; and
    determining, via the processor, whether to provide charging power to the battery of the second electric vehicle, discontinue charging the battery of the second electric vehicle being charged, or simultaneously charge the first electric vehicle.

15. The method of claim 14, wherein the information is at least one of:
    power management settings, user settings, weather information, and availability of charging stations or gas stations proximate to a planned route of travel.

16. The method of claim 14 further comprising changing the priority based on additional information received during charging of the first electric vehicle so that the second electric vehicle will begin receiving charging power.

17. The method of claim 14, wherein determining whether to discontinue charging the battery of the first electric vehicle is dependent on power management settings stored on a memory.

18. The method of claim 14, wherein determining whether to discontinue charging the battery of the first electric vehicle is dependent on user preferences received via the input device.

19. The method of claim 14, wherein determining the priority for providing charging power is dynamic and updated automatically based on additional information received so that charging between the first and second electric vehicles may alternate as determined by the processor.

20. The method of claim 14, further comprising:
    charging the battery of the first electric vehicle until it is complete prior to determining whether to provide charging power to the battery of the second electric vehicle.

21. The method of claim 14, further comprising:
    providing a notification to the user when any of the batteries of the multiple electric vehicles has met a satisfactory charge level.

22. The method of claim 21, further comprising:
    determining the satisfactory charge level from user preferences received via the input device.

23. The method of claim 14, further comprising:
    providing charging power to the battery of the second priority electric vehicle via the respective vehicle connector.

24. An apparatus for charging a plurality of electric vehicles, comprising:
    means for connecting configured to couple with an electrical socket;
    means for conducting power having a first end connected to the means for connecting and a plurality of distal ends, and the means for connecting configured to convey an AC voltage from the electrical socket to the plurality of electric vehicles;
    a first means for relaying placed inline with the means for conducting power and configured to control voltage along the means for conducting power;
    means for controlling connected to the means for conducting power and configured to generate signals corresponding to the AC voltage along the means for conducting power;
    a plurality of means for vehicle connecting each connected to a respective one of the plurality of distal ends of the means for conducting power and configured to connect to a respective one of the plurality of electric vehicles to provide the AC voltage to the plurality of electric vehicles;
    a second means for relaying placed inline with the means for conducting power and configured to control AC voltage to the plurality of means for vehicle connecting to charge the plurality of electric vehicles;
    means for processing connected to the means for controlling and configured to receive signals from and send signals to the means for controlling to control whether to continue charging, discontinue charging, begin charging a different vehicle, or simultaneously charge the plurality of electric vehicles;
    a voltage monitor connected to the means for processing;
    a pulse width modulator connected to the means for processing;
    a display connected to the means for processing; and a switch connected to the means for conducting power and the first means for relaying, wherein the means for processing is configured to control the switch in order to provide a level I or level II voltage to the plurality of electric vehicles.

\* \* \* \* \*